United States Patent
Zhang et al.

(10) Patent No.: US 12,429,892 B1
(45) Date of Patent: Sep. 30, 2025

(54) CONTROL METHOD, CONTROL SYSTEM AND STORAGE MEDIUM FOR WATER-DISPENSING AND ICE-MAKING MACHINE

(71) Applicant: NINGBO AQUART ELECTRICAL APPLIANCE CO., LTD, Zhejiang (CN)

(72) Inventors: Chunyun Zhang, Zhejiang (CN); Diying Yuan, Zhejiang (CN); Jinlong Pan, Zhejiang (CN); Zhaoxi Feng, Zhejiang (CN); Shenggui Long, Zhejiang (CN)

(73) Assignee: NINGBO AQUART ELECTRICAL APPLIANCE CO., LTD, Zhejiang (CN)

( * ) Notice: Subject to any disclaimer, the term of this patent is extended or adjusted under 35 U.S.C. 154(b) by 0 days.

(21) Appl. No.: 19/240,035

(22) Filed: Jun. 17, 2025

(30) Foreign Application Priority Data

Mar. 24, 2025 (CN) .......................... 202510351117.2

(51) Int. Cl.
  *G05D 23/13* (2006.01)
  *G05D 7/06* (2006.01)
(52) U.S. Cl.
  CPC ....... *G05D 23/1333* (2013.01); *G05D 7/0623* (2013.01); *G05D 23/1353* (2013.01); *G05D 23/1373* (2013.01); *Y10T 137/2499* (2015.04)
(58) Field of Classification Search
  CPC ............. G05D 7/0623; G05D 23/1333; G05D 23/134; G05D 23/1346; G05D 23/1353;
  (Continued)

(56) References Cited

U.S. PATENT DOCUMENTS 2,456,094 A * 12/1948 Victoreen ............ G05D 23/134
                                                            251/356
9,244,466 B2 * 1/2016 DuPlessis ............. F24H 9/2021
(Continued)

FOREIGN PATENT DOCUMENTS

CN          102342752 A     2/2012
CN          102613899 A     8/2012
(Continued)

OTHER PUBLICATIONS

First Office Action received in corresponding Chinese patent application No. 202510351117.2, dated May 12, 2025, 23 pages.

*Primary Examiner* — William M Mccalister
(74) *Attorney, Agent, or Firm* — Cooper Legal Group, LLC

(57) ABSTRACT

The present application relates to a control method, a control system and a storage medium for a water-dispensing and ice-making machine. The control method includes: obtaining a warm water usage trigger signal; obtaining warm water parameters of a warm water tank; determining whether the warm water parameters comply with requirements of preset warm water usage parameters; if yes, controlling a warm water dispensing device to dispense warm water in the warm water tank for use, continuing to obtain the warm water parameters for iterative determination; if no, controlling a warm water mixing device to pump water from a hot water tank and a cold water tank into the warm water tank for mixing to replenish warm water, continuing to obtain the warm water parameters for iterative determination; receiving a warm water shutdown trigger signal; and controlling the warm water dispensing device and the warm water mixing device to turn off.

10 Claims, 9 Drawing Sheets

(58) Field of Classification Search
CPC ............. G05D 23/136; G05D 23/1373; G05D 23/1393; Y10T 137/0329; Y10T 137/2499
USPC ...................................................... 137/3, 88
See application file for complete search history.

(56) References Cited

U.S. PATENT DOCUMENTS

| | | | |
|---|---|---|---|
| 10,760,819 B2 * | 9/2020 | Yuan | ................... G05D 23/1393 |
| 2018/0306463 A1 * | 10/2018 | Yuan | .......................... F24H 1/44 |
| 2018/0347830 A1 * | 12/2018 | Callahan | ............... F24H 15/219 |

FOREIGN PATENT DOCUMENTS

| | | |
|---|---|---|
| CN | 104331104 A | 2/2015 |
| CN | 108143287 A | 6/2018 |
| CN | 108799610 A | 11/2018 |
| CN | 209789580 U | 12/2019 |
| JP | 2003130486 A | 5/2003 |
| KR | 20180138229 A | 12/2018 |

\* cited by examiner

CONTROL METHOD, CONTROL SYSTEM AND STORAGE MEDIUM FOR WATER-DISPENSING AND ICE-MAKING MACHINE

CROSS-REFERENCE TO RELATED APPLICATION

This application claims the priority to Chinese patent application serial no. 202510351117.2, filed on Mar. 24, 2025. The entirety of Chinese patent application serial no. 202510351117.2 is hereby incorporated by reference herein and made a part of this specification.

TECHNICAL FIELD

The present application relates to a technical field of water-dispensing and ice-making machines, and in particular, to a control method, a system, an intelligent terminal and a storage medium for a water-dispensing and ice-making machine.

BACKGROUND

A water-dispensing and ice-making machine is a device specifically designed to provide drinking water and ice cubes, and usually placed in public places such as offices, schools, hospitals, homes, and personal spaces, providing people with readily available drinking water and ice.

In a related technology, the water-dispensing and ice-making machine usually has three options: cold water, hot water, and ice dispensing. When users use the water-dispensing and ice-making machine, they can press a cold water button, a hot water button, or an ice dispensing button as required to receive water. However, when users need to use warm water, they usually mix some hot water and some cold water for use.

Regarding the related technology mentioned above, when a user requires warm water, it is necessary to press two separate buttons—first pumping water at one temperature, then pumping water at another temperature—and subsequently mixing the two to obtain warm water. This results in cumbersome operation of the water-dispensing and ice-making machine, leaving room for improvement.

SUMMARY

In order to improve a convenience of using a water-dispensing and ice-making machine, the present application provides a control method, a control system, and a storage medium for a water-dispensing and ice-making machine.

In a first aspect, the present application provides a method for a water-dispensing and ice-making machine, including: obtaining a warm water usage trigger signal of the water-dispensing and ice-making machine; obtaining warm water parameters of a warm water tank based on the warm water usage trigger signal; determining whether the warm water parameters comply with requirements of preset warm water usage parameters; when it is determined that the warm water parameters comply with the requirements of the preset warm water usage parameters, controlling a warm water dispensing device to dispense warm water in the warm water tank for use, and continuing to obtain the warm water parameters for iterative determination; when it is determined that the warm water parameters fail to comply with the requirements of the preset warm water usage parameters, controlling a warm water mixing device to pump water from a hot water tank and a cold water tank into the warm water tank for mixing to replenish the warm water, and continuing to obtain the warm water parameters for iterative determination; receiving a warm water shutdown trigger signal; and controlling the warm water dispensing device and the warm water mixing device to shut down based on the warm water shutdown trigger signal.

In a second aspect, the present application provides a control system for a water-dispensing and ice-making machine, including: an acquisition module, configured to obtain a warm water usage trigger signal, warm water parameters, and a warm water shutdown trigger signal; a memory, configured to store a program for executing the method for the water-dispensing and ice-making machine mentioned above; and a processor, configured to perform the method for the water-dispensing and ice-making machine mentioned above when loading and executing the program in the memory.

In a third aspect, the present application provides an intelligent terminal including a memory and a processor, wherein the memory stores a computer program, that when loaded and executed by the processor, implement the control method for the water-dispensing and ice-making machine as mentioned above.

In a fourth aspect, the present application provides a computer-readable storage medium storing a computer program, when loaded and executed by a processor, implement the control method for the water-dispensing and ice-making machine mentioned above.

DETAILED DESCRIPTION

In order to make objectives, technical solutions, and advantages of the present application clearer, the present application will be further described in detail below with reference to FIGS. 1-9 and corresponding embodiments. It should be understood that embodiments and explanations of the present application herein are only used to explain the present application and are not intended to limit the present application.

An embodiment of the present application provides a control method for a water-dispensing and ice-making machine, specifically including a processing terminal, a warm water dispensing device, and a warm water mixing device. The processing terminal is connected to the warm water dispensing device and the warm water mixing device via a data wire to achieve data interaction and control. The processing terminal sends an instruction to control a relevant sensor to detect a warm water parameter of a warm water tank when receiving a warm water usage trigger signal. The processing terminal controls the warm water dispensing device to dispense warm water in the warm water tank for personnel use when determining that the warm water parameters comply with requirements of warm water usage parameters, and controls the warm water mixing device to pump water from a hot water tank and a cold water tank into the warm water tank for mixing to replenish the warm water when determining that the warm water parameters fail to comply with the requirements of the warm water usage parameters. This ensures an adequate supply of the warm water without requiring users to repeatedly draw and mix hot and cold water themselves, thereby improving user-friendliness of the water-dispensing and ice-making machine.

Figure 1:
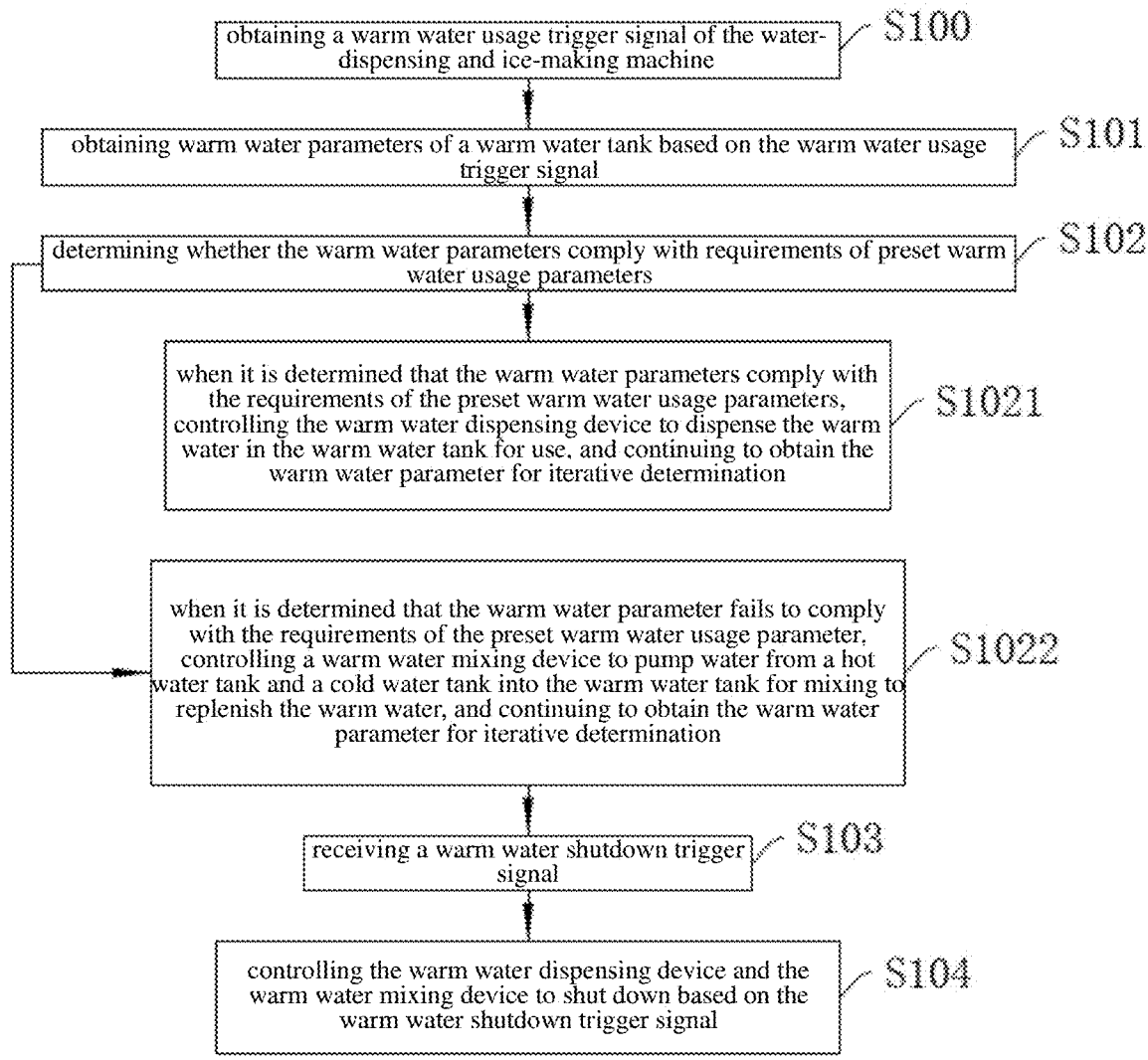
FIG. 1 is a flowchart of a control method for a water-dispensing and ice-making machine according to an embodiment of the present application.

Referring to FIG. 1, an embodiment of the present application provides a control method for a water-dispensing and ice-making machine, including the following steps:

Step S100: obtaining a warm water usage trigger signal of the water-dispensing and ice-making machine.

Figure 8:
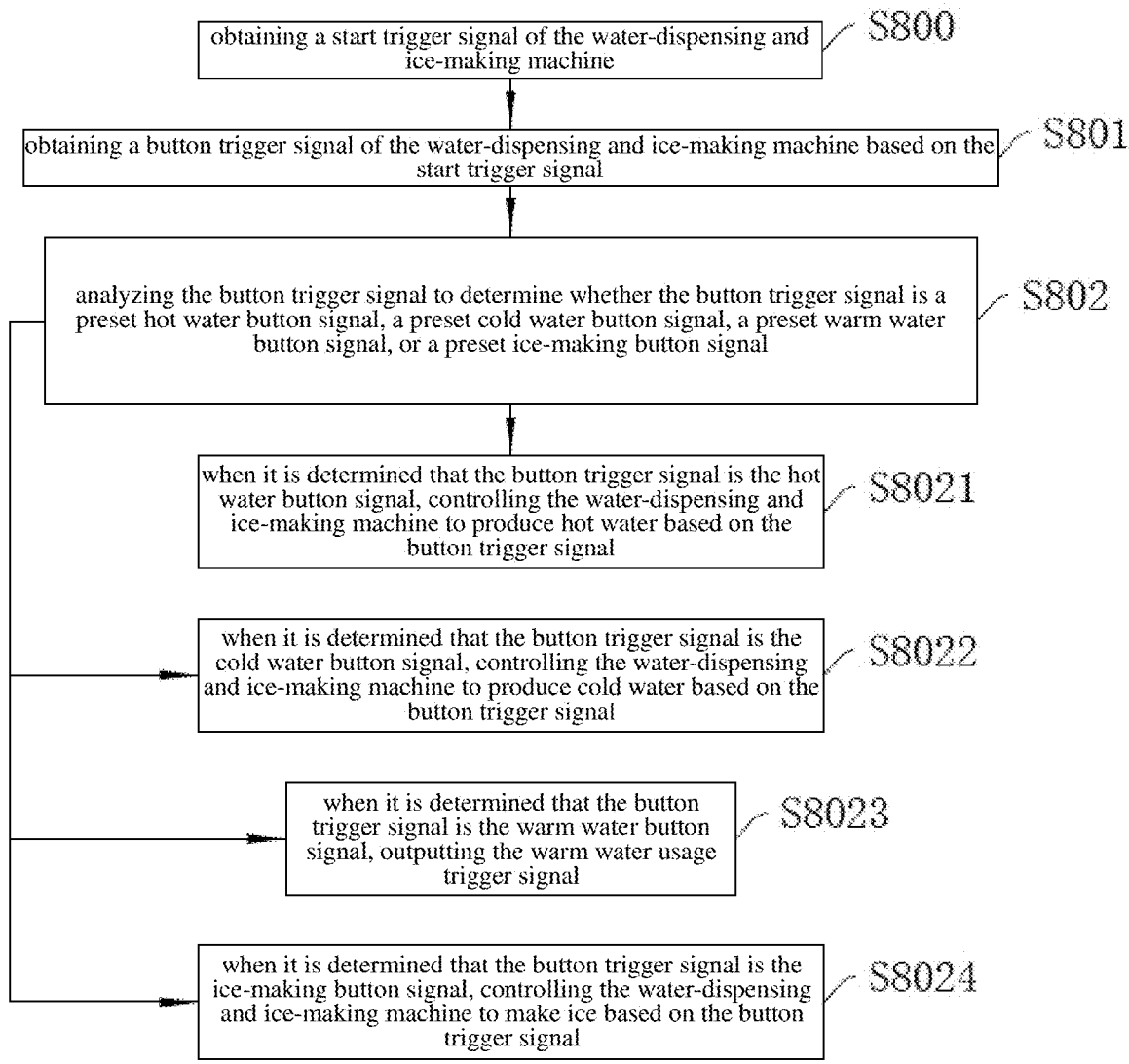
FIG. 8 is a flowchart of obtaining a warm water usage trigger signal of the water-dispensing and ice-making machine according to an embodiment of the present application.

Wherein, the warm water usage trigger signal refers to a trigger signal generated when a user requires warm water, with a specific method for obtaining this signal being as described in steps of FIG. 8.

Step S101: obtaining warm water parameters of a warm water tank based on the warm water usage trigger signal.

Wherein, upon receiving the warm water usage trigger signal, the processing terminal responds to the warm water usage trigger signal by detecting the warm water parameters of the warm water tank, thereby providing data support for subsequent determination of whether the warm water can be dispensed.

The warm water tank refers to a water tank which is used to store warm water. The warm water parameters include a water volume and a water temperature of existing warm water in the warm water tank, which are detected by a temperature sensor and a force-sensitive sensor installed on the warm water tank.

Step S102: determining whether the warm water parameters comply with requirements of preset warm water usage parameters.

Wherein, the warm water usage parameters include a warm water temperature and a warm water volume in the warm water tank when the warm water is normally dispensed, with specific values determined by an operator as required. The warm water parameters are determined as complying with the requirements of the preset warm water usage parameters when the warm water temperature equals corresponding temperature specified in the warm water usage parameters, while the warm water volume is not less than corresponding water volume specified therein.

Whether the existing warm water in the warm water tank can be directly dispensed for use may be determined by determining whether the corresponding temperature in the warm water parameters is equal to the corresponding temperature in the warm water usage parameters, and whether the corresponding water volume in the warm water parameters is not less than the corresponding water volume in the warm water usage parameters through the processing terminal.

Step S1021: when it is determined that the warm water parameters comply with the requirements of the preset warm water usage parameters, controlling the warm water dispensing device to dispense the warm water in the warm water tank for use, and continuing to obtain the warm water parameter for iterative determination.

Wherein, if the processing terminal determines that the corresponding temperature in the warm water parameters is equal to the corresponding temperature in the warm water usage parameters, and the corresponding water volume in the warm water parameters is not less than the corresponding water volume in the warm water usage parameters, this indicates that the water temperature and the water volume in the warm water tank comply with normal use requirements. The processing terminal therefore controls the warm water dispensing device to dispense the warm water from the warm water tank for use, while concurrently continuing to detect the warm water parameters to monitor conditions of the warm water in the warm water tank continuously.

The warm water dispensing device may be a valve installed on a warm water outlet pipe, which is used to control an opening and closing of the warm water outlet pipe, thereby controlling outflow of the warm water.

Step S1022: when it is determined that the warm water parameter fails to comply with the requirements of the preset warm water usage parameter, controlling a warm water mixing device to pump water from a hot water tank and a cold water tank into the warm water tank for mixing to replenish the warm water, and continuing to obtain the warm water parameter for iterative determination.

Wherein, if the processing terminal determines that the corresponding temperature in the warm water parameters is lower than the corresponding temperature in the warm water usage parameters, or the corresponding water volume in the warm water parameters is less than the corresponding water volume in the warm water usage parameters, this indicates that the water temperature or the water volume in the warm water tank fails to comply with the normal use requirements. The processing terminal therefore, controls the warm water mixing device to pump water from the hot water tank and the cold water tank into the warm water tank for mixing to replenish the warm water. The specific method for this operation specific method as detailed in steps of FIG. 2, while continuous detection of the warm water parameters is maintained to monitor the replenishment of the warm water in the warm water tank.

The hot water tank may be a water tank in the water-dispensing and ice-making machine that stores hot water, and the cold water tank may be a water tank in the water-dispensing and ice-making machine that stores cold water. The warm water mixing device may be a device that pumps water from the hot water tank and the cold water tank into the warm water tank, including two water pumps and water pipes correspondingly connecting the warm water tank, the hot water tank, and the cold water tank.

Step S103: receiving a warm water shutdown trigger signal.

Wherein, the warm water shutdown trigger signal refers to a signal that stops dispensing of the warm water. When a user gently presses a warm water button again, the warm water shutdown trigger signal stored in the processing terminal is activated.

Step S104: controlling the warm water dispensing device and the warm water mixing device to shut down based on the warm water shutdown trigger signal.

Wherein, upon receiving the warm water shutdown trigger signal, the processing terminal responds to the warm water shutdown trigger signal by controlling the warm water dispensing device and the warm water mixing device to shut down. In this way, warm water can be prevented from continuing to flow out, and excessive replenishment of the warm water can be avoided, so that the warm water temperature can be prevented from dropping.

Figure 2:
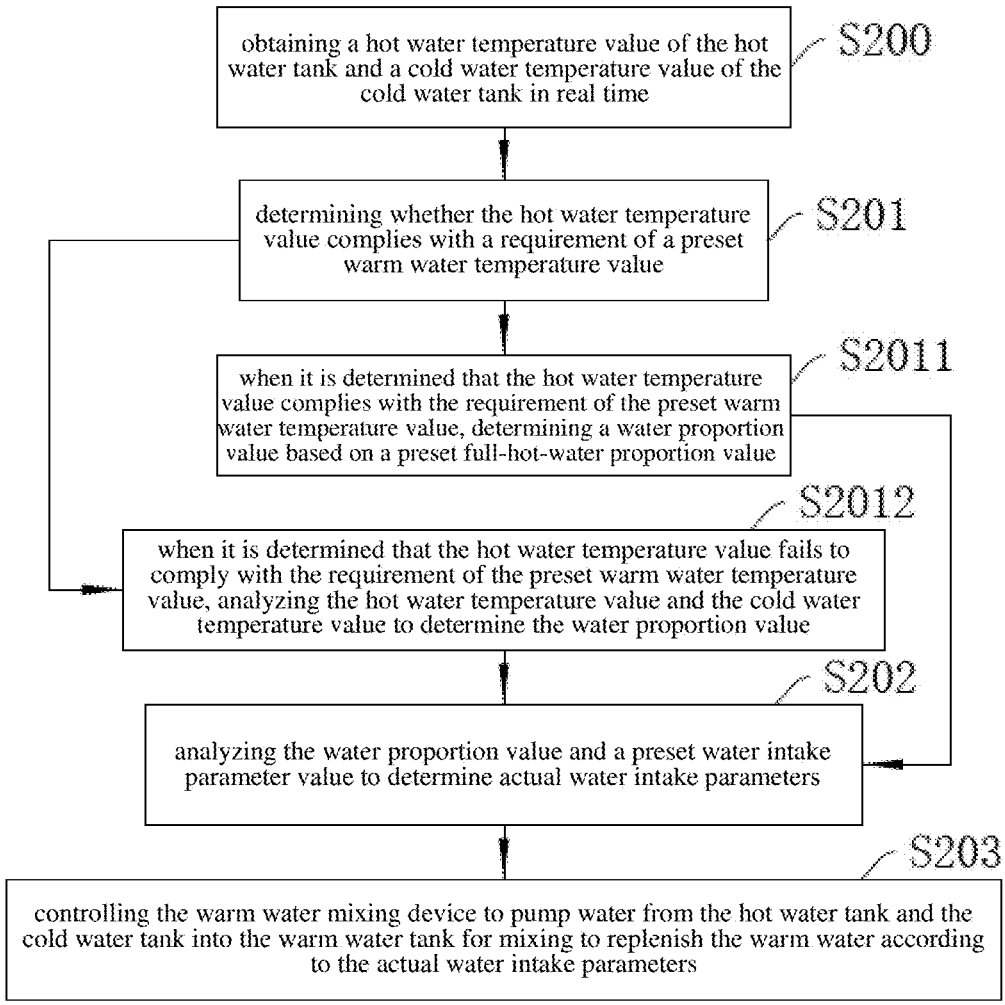
FIG. 2 is a flowchart of controlling a warm water mixing device to pump water from a hot water tank and a cold water tank into a warm water tank for mixing to replenish warm water according to an embodiment of the present application.

Referring to FIG. 2, a step of controlling the preset warm water mixing device to pump water from the preset hot water tank and the preset cold water tank into the warm water tank for mixing to replenish the warm water includes:

Step S200: obtaining a hot water temperature value of the hot water tank and a cold water temperature value of the cold water tank in real time.

Wherein, the hot water temperature value refers to a temperature value of the hot water in the hot water tank, which is detected by a temperature sensor installed on the hot water tank and sent to the processing terminal. The cold water temperature value refers to a temperature value of the cold water in the cold water tank, which is detected by a temperature sensor installed on the cold water tank and sent to the processing terminal.

Step S201: determining whether the hot water temperature value complies with a requirement of a preset warm water temperature value.

Wherein, the warm water temperature value refers to the temperature value of usable warm water, with its specific value being determined by the operator according to the actual conditions. The requirement of the preset warm water temperature value refers to that an actual warm water temperature should be equal to the preset warm water temperature value.

The processing terminal determine whether only the hot water needs to be drew into the warm water tank by determining whether the hot water temperature value is equal to the preset warm water temperature value.

Step S2011: when it is determined that the hot water temperature value complies with the requirement of the preset warm water temperature value, determining a water proportion value based on a preset full-hot-water proportion value.

Wherein, if the processing terminal determines that the hot water temperature value is equal to the warm water temperature value, this indicates that the water temperature in the hot water tank exactly complies with user requirements for immediate use. Therefore, determining The processing terminal therefore determines the full-hot-water proportion value as the water proportion value.

The full-hot-water proportion value refers to a proportion value indicating exclusive use of hot water. The water proportion values include pumping proportion values of the hot water to the cold water. In this step, the processing terminal directly defines the full-hot-water proportion value as the water proportion value.

Step S2012: when it is determined that the hot water temperature value fails to comply with the requirement of the preset warm water temperature value, analyzing the hot water temperature value and the cold water temperature value to determine the water proportion value.

Wherein, if the processing terminal determines that the hot water temperature value is not equal to the warm water temperature value, which indicates that the hot water temperature value is higher than the warm water temperature value. Therefore, the cold water needs to be mixed in to lower the hot water temperature value. The processing terminal consequently determines the water proportion value by analyzing the hot water temperature value and cold water temperature value, with a specific method being as detailed in steps of FIG. 3.

Figure 3:
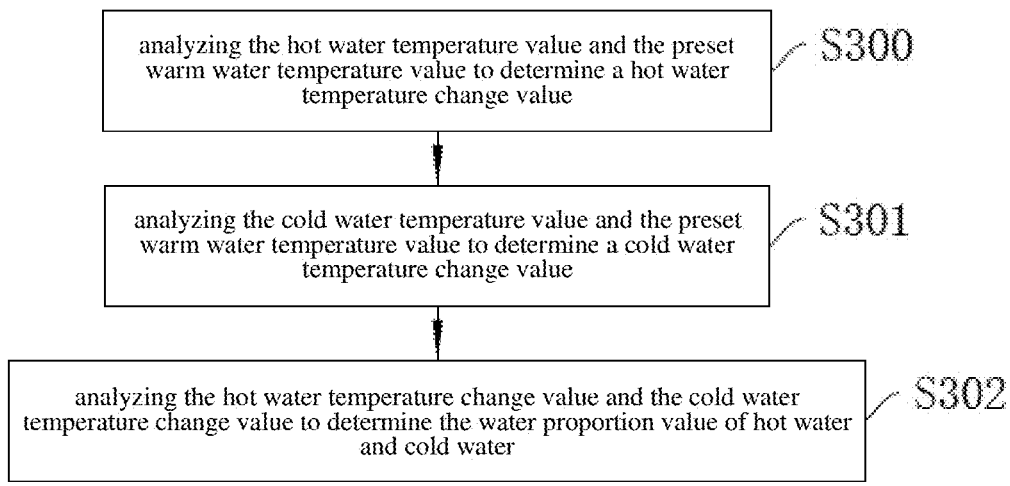
FIG. 3 is a flowchart of analyzing a hot water temperature value and a cold water temperature value to determine a water proportion value according to an embodiment of the present application.

A definition of the water proportion value in this step is consistent with that in Step S2011, but the water proportion value in this step is determined by the processing terminal through analysis of the hot water temperature value and the cold water temperature value, with the specific method being as detailed in steps in FIG. 3.

Step S202: analyzing the water proportion value and a preset water intake parameter value to determine actual water intake parameters.

Wherein, the water intake parameter value refers to a flow rate of water drew into the warm water tank, with a specific value being determined by the operator according to the actual conditions. The actual water intake parameters include a hot water pumping flow rate and a cold water pumping flow rate allocated based on the water intake parameter values. These parameters are derived by the processing terminal allocating the water intake parameter values based on the water proportion value. For example, when the water proportion value is 1:1, the water intake parameter values are equally allocated between both flows.

Step S203: controlling the warm water mixing device to pump water from the hot water tank and the cold water tank into the warm water tank for mixing to replenish the warm water according to the actual water intake parameters.

Figure 6:
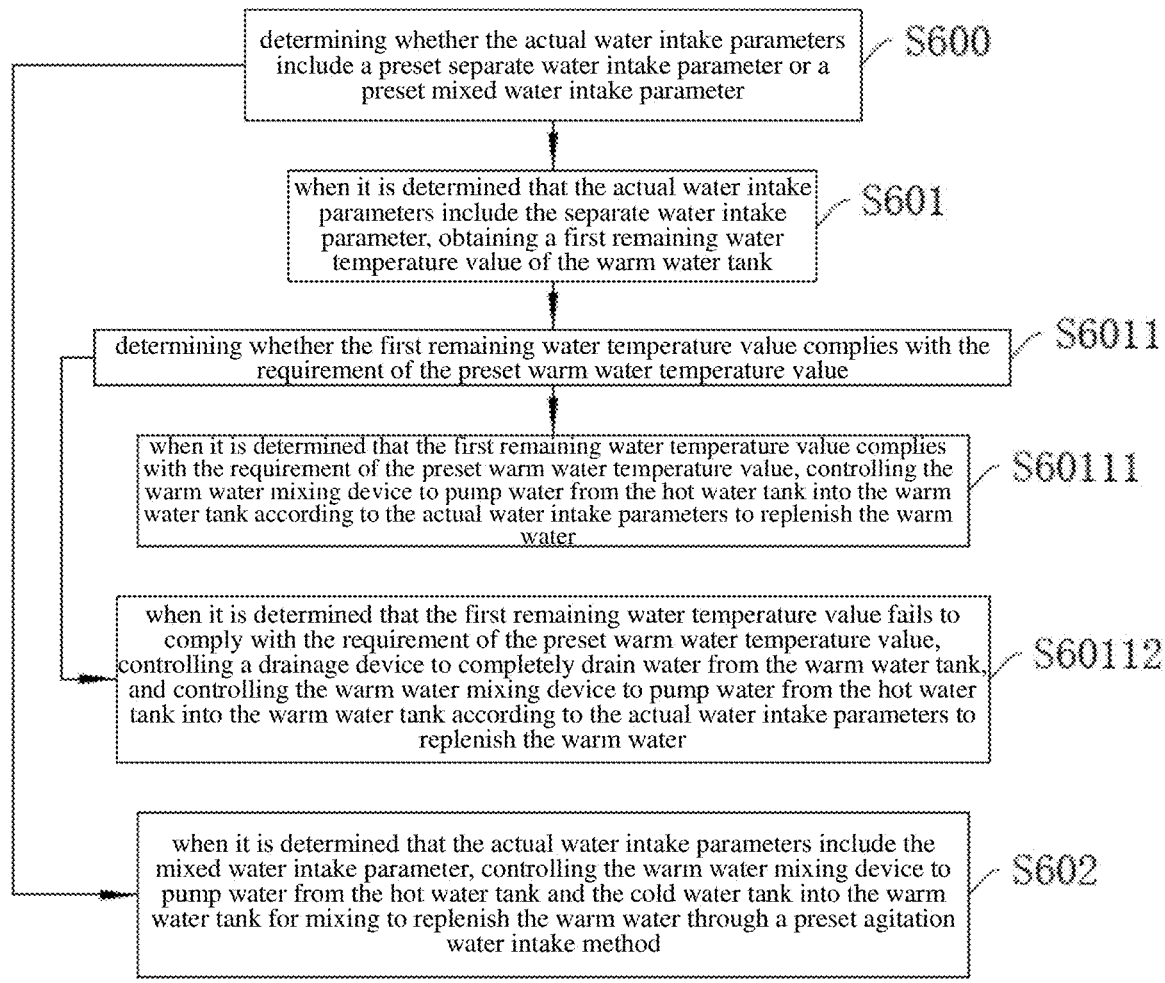
FIG. 6 is a flowchart of controlling the warm water mixing device to pump water from the hot water tank and the cold water tank into the warm water tank for mixing to replenish warm water according to actual water intake parameters according to an embodiment of the present application.

Wherein, upon determining the actual water intake parameters, the processing terminal controls the warm water mixing device to pump water from the hot water tank and the cold water tank into the warm water tank according to the hot water pumping flow rate and the cold water pumping flow rate corresponding to the actual water intake parameters, so as to replenish the warm water in the warm water tank based on an usage temperature of the warm water, with a specific method being as detailed steps of FIG. 6.

When determining that the hot water temperature value complies with the requirement of the preset warm water temperature value, this indicates that the water temperature in the hot water tank exactly complies with the required temperature for the warm water. The processing terminal therefore determines the full-hot-water proportion value as the water proportion value. Whereas, when the water temperature in the hot water tank exceeds the preset warm water temperature value, cold water introduction becomes necessary for temperature reduction. Therefore, the processing terminal determines the water proportion value through analysis of the hot water temperature value and the cold water temperature value, subsequently deriving the actual water intake parameters based on the water proportion value and the water intake parameter values. In this way, the warm water mixing device is controlled to pump water from the hot water tank and the cold water tank into the warm water tank for mixing to replenish the warm water according to the actual water intake parameters, thereby improving an accuracy of warm water replenishment.

Referring to FIG. 3, step of analyzing the hot water temperature value and the cold water temperature value to determine the water proportion value includes:

Step S300: analyzing the hot water temperature value and the preset warm water temperature value to determine a hot water temperature change value.

Wherein, the hot water temperature change value refers to a required temperature change for reducing the hot water temperature value to the preset warm water temperature value, which is calculated by the processing terminal as a difference between the hot water temperature value and the preset warm water temperature value.

Step S301: analyzing the cold water temperature value and the preset warm water temperature value to determine a cold water temperature change value.

Wherein, the cold water temperature change value refers to a required temperature change increase for elevating the cold water temperature value to the preset warm water temperature value, which is calculated by the processing terminal as a difference between the warm water temperature value and the preset cold water temperature value.

Step S302: analyzing the hot water temperature change value and the cold water temperature change value to determine the water proportion value of hot water and cold water.

Wherein, the water proportion value in this step is consistent with that in Step S2012. The water proportion value is computationally derived by the processing terminal through application of thermodynamic equilibrium principles, specifically by calculating an inverse ratio between the hot water temperature change value and the cold water temperature change value. According to the ratio between the hot water temperature change value and the cold water temperature change value, which is equal to an inverse ratio between the hot water volume and the cold water volume, the water proportion value is calculated to improve an accuracy of determining the water proportion value.

Figure 4:
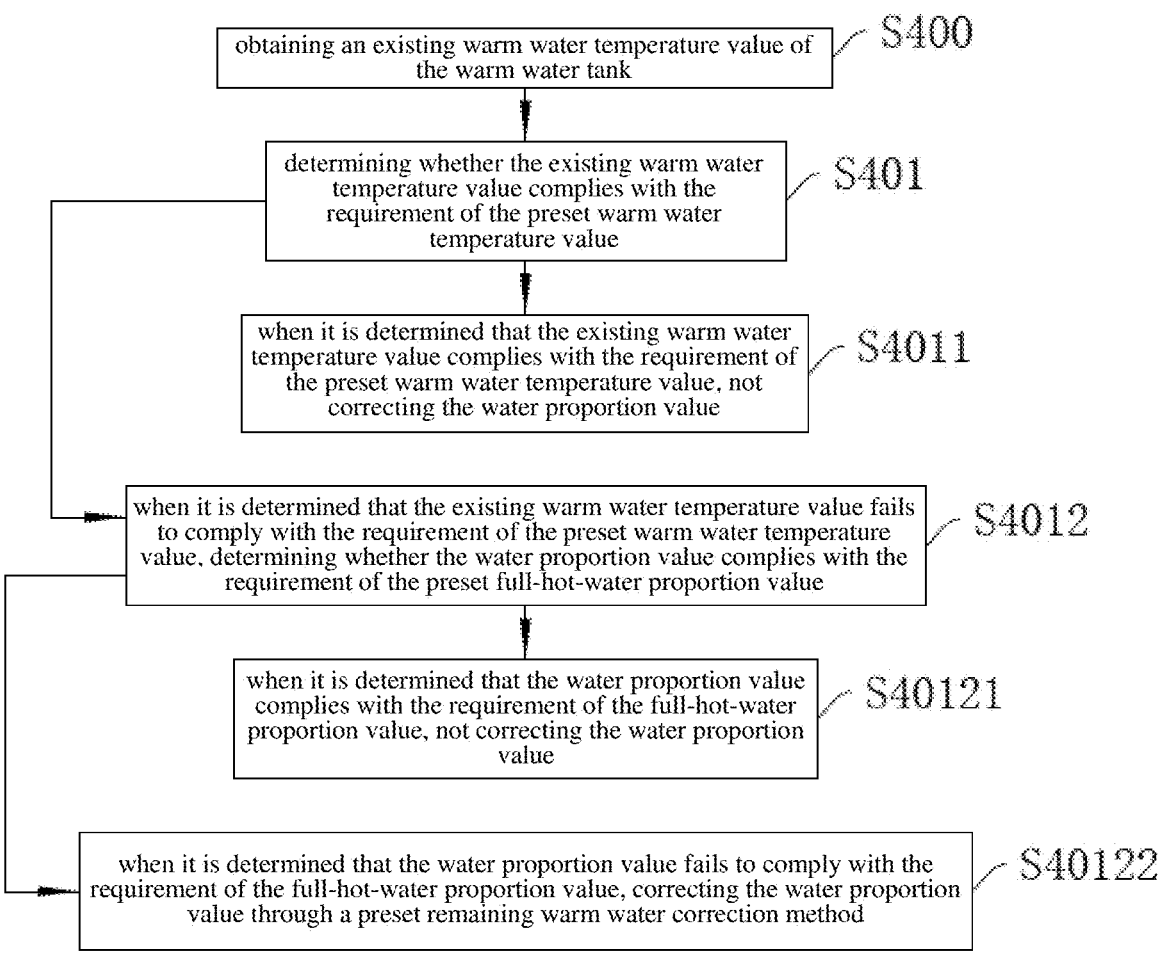
FIG. 4 is a flowchart of correcting the water proportion value according to an embodiment of the present application.

Referring to FIG. 4, after the water proportion value is determined, the control method further includes steps of correcting the water proportion value as follows:

Step S400: obtaining an existing warm water temperature value of the warm water tank.

Wherein, the existing warm water temperature value refers to the water temperature in the warm water tank before replenishing the warm water, which is detected by the temperature sensor installed on the warm water tank and sent to the processing terminal.

Step S401: determining whether the existing warm water temperature value complies with the requirement of the preset warm water temperature value.

Wherein, the requirement of the preset warm water temperature value in this step is consistent with that in Step S201, and will not be repeated here.

The processing terminal determines whether the existing warm water temperature value is equal to the warm water temperature value, thereby determining whether an temperature influence of the existing warm water needs to be considered when pumping water into the warm water tank.

Step S4011: when it is determined that the existing warm water temperature value complies with the requirement of the preset warm water temperature value, not correcting the water proportion value.

Wherein, if the processing terminal determines that the existing warm water temperature value is equal to the preset warm water temperature value, this indicates that the warm water temperature in the warm water tank is directly usable. When pumping water into the warm water tank, the existing water temperature will not affect a mixing temperature of the hot water and the cold water, and thus the water proportion value will not be corrected.

Step S4012: when it is determined that the existing warm water temperature value fails to comply with the requirement of the preset warm water temperature value, determining whether the water proportion value complies with the requirement of the preset full-hot-water proportion value.

Wherein, the requirement of the full-hot-water proportion value refers to that the water proportion value is equal to the full-hot-water proportion value.

If the processing terminal determines that the existing warm water temperature value is not equal to the preset warm water temperature value, this indicates that the warm water temperature in the warm water tank is lower than the preset warm water temperature for use. When pumping water into the warm water tank, the existing water temperature will affect the mixing temperature of the hot water and the cold water. Therefore, it is necessary to determine whether the water proportion value is consistent with the full-hot-water proportion value, thereby determining whether it is necessary to consider an influence of the existing water temperature.

Step S40121: when it is determined that the water proportion value complies with the requirement of the full-hot-water proportion value, not correcting the water proportion value.

Wherein, if the processing terminal determines that the water proportion value is consistent with the full-hot-water proportion value, this indicates that only hot water has a temperature equal to the usage temperature of the warm water is drew in. At this time, although the existing water temperature is low, changing the proportion value cannot improve an efficiency of warm water formation, and thus no correction is performed on the water proportion value.

Step S40122: when it is determined that the water proportion value fails to comply with the requirement of the full-hot-water proportion value, correcting the water proportion value through a preset remaining warm water correction method.

Wherein, if the processing terminal determines that the water proportion value is inconsistent with the full-hot-water proportion value, this indicates concurrent pumping of both hot and cold water. At this time, the temperature of the hot water is higher than the usage temperature of the warm water. Although the existing water temperature is low, mixing higher-temperature hot water with the existing warm water can elevates the temperature of the existing warm water. Therefore, the water proportion value is corrected through a remaining warm water correction method, as detailed in steps of FIG. 5, by increasing a proportion of the hot water, and thus the temperature of remaining warm water can be rapidly raised to the usage temperature.

The remaining warm water correction method refers to a proportional adjustment process that accounts for both temperature and weight of the remaining warm water. This method is stored in the processing terminal by the operator. When it is determined that the existing warm water temperature value complies with the requirement of the preset warm water temperature value, or when the existing warm water temperature value fails to comply with the requirement of the preset warm water temperature value and the water proportion value complies with the requirement of the full hot water proportion value, there is no need to correct the water proportion value. However, when the water proportion value fails to comply with the requirement of the full hot water proportion value, correction on the water proportion value is performed according to the remaining warm water correction method, so as to ensure that the temperature in the warm water tank is maintained at required temperature value after intaking water with the water proportion value, thereby improving accuracy of the water proportion value.

Figure 5:
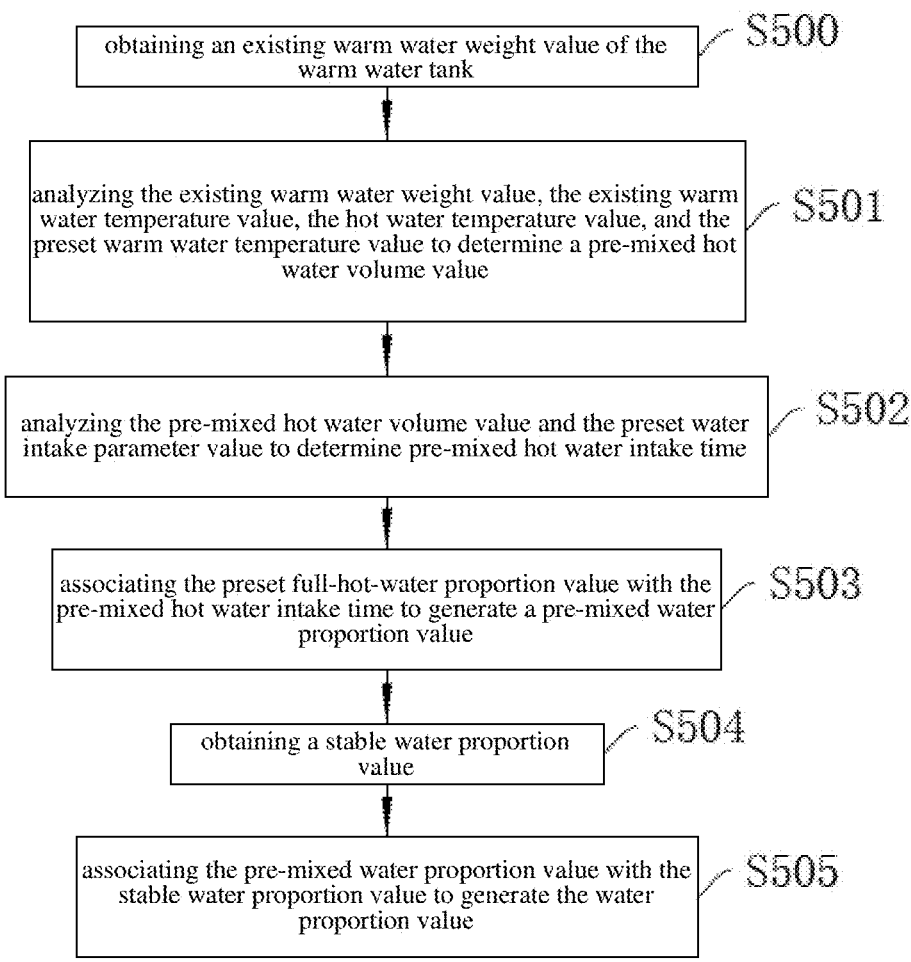
FIG. 5 is a flowchart of correcting the water proportion value through a preset remaining warm water correction method according to an embodiment of the present application.

Referring to FIG. 5, correcting the water proportion value through the preset remaining warm water correction method includes:

Step S500: obtaining an existing warm water weight value of the warm water tank.

Wherein, the existing warm water weight value refers to a weight of remaining warm water in the warm water tank before replenishing the warm water, which is detected by the force-sensitive sensor installed on the warm water tank and sent to the processing terminal.

Step S501: analyzing the existing warm water weight value, the existing warm water temperature value, the hot water temperature value, and the preset warm water temperature value to determine a pre-mixed hot water volume value.

Wherein, the pre-mixed hot water volume value refers to a weight of hot water that needs to be added to raise the temperature of the remaining warm water to the usage temperature. The processing terminal calculates a proportion of a change value from the existing warm water temperature value to the warm water temperature value and a change value from the hot water temperature value to the warm water temperature value through application of thermodynamic equilibrium principles, and then calculates a product of the existing warm water weight value and this proportion to obtain the pre-mixed hot water volume value.

Step S502: analyzing the pre-mixed hot water volume value and the preset water intake parameter value to determine pre-mixed hot water intake time.

Wherein, the pre-mixed hot water intake time refers to time required for the hot water to raise the temperature of the remaining warm water to the usage temperature, which is calculated by the processing terminal as a quotient between the pre-mixed hot water volume value and the flow rate corresponding to the water intake parameter value.

Step S503: associating the preset full-hot-water proportion value with the pre-mixed hot water intake time to generate a pre-mixed water proportion value.

Wherein, the pre-mixed water proportion value refers to a proportion value of raising the temperature of the remaining warm water to the usage temperature, which is obtained by storing the full-hot-water proportion value and the pre-mixed hot water intake time in a same data packet by the processing terminal.

Step S504: obtaining a stable water proportion value.

Wherein, the stable water proportion value refers to a water pumping proportion value after the temperature of the remaining warm water is raised to the usage temperature, which is the proportion value before correction.

Step S505: associating the pre-mixed water proportion value with the stable water proportion value to generate the water proportion value.

Wherein, the water proportion value in this step is generated by the processing terminal sequentially storing the pre-water proportion value and the stable water proportion value in the same data packet. This enables hot water first enters the warm water tank for a certain period, raising the temperature of the remaining warm water to the usage temperature. Subsequently, hot and cold water are pumped in a specific proportion to mix and replenish the warm water at the same temperature.

Based on the existing warm water weight value, the existing warm water temperature value, the hot water temperature value, and the preset warm water temperature value, the pre-mixed hot water volume value is determined for hot water entering the warm water tank to raise the temperature of the remaining water to the required temperature. The pre-mixed hot water intake time is calculated based on the pre-mixed hot water volume value and the water intake parameter value, the full-hot-water proportion value is associated with the pre-mixed hot water intake time to obtain the pre-mixed water proportion value for raising the temperature of the remaining water in the warm water tank to the required temperature. After the pre-mixed water proportion value is associated with the stable water proportion value, the water proportion value is obtained, thereby improving the accuracy of the water proportion value.

Referring to FIG. 6, controlling the warm water mixing device to pump water from the hot water tank and the cold water tank into the warm water tank for mixing to replenish the warm water according to the actual water intake parameter includes:

Step S600: determining whether the actual water intake parameters include a preset separate water intake parameter or a preset mixed water intake parameter.

Wherein, the separate water intake parameter refers to a condition where only hot water enters the warm water tank, and the mixed water intake parameter refers to a condition where both hot and cold water enter the warm water tank. Both of the separate water intake parameter and the mixed water intake parameter are stored in the processing terminal by the operator.

The processing terminal determines whether the actual water intake parameters include the separate water intake parameter or the mixed water intake parameter, thereby determining the specific method for pumping water into the warm water tank to replenish the warm water.

Step S601: when it is determined that the actual water intake parameters include the separate water intake parameter, obtaining a first remaining water temperature value of the warm water tank.

Wherein, if the processing terminal determines that the actual water intake parameters include the separate water intake parameter, this indicates that the warm water mixing device only pumps hot water into the warm water tank. At this time, the first remaining water temperature value of the warm water tank is detected to provide data support for subsequent specific hot water pumping control.

The first remaining water temperature value refers to a temperature value of the remaining warm water in the warm water tank before hot water is pumped in, which is detected by the temperature sensor installed on the warm water tank and sent to the processing terminal.

Step S6011: determining whether the first remaining water temperature value complies with the requirement of the preset warm water temperature value.

Wherein, the requirement of the preset warm water temperature value in this step is consistent with that in Step S201, and will not be repeated here.

The processing terminal determines whether the first remaining water temperature value is equal to the warm water temperature value, thereby determining whether the hot water can be directly drew into the warm water tank.

Step S60111: when it is determined that the first remaining water temperature value complies with the requirement of the preset warm water temperature value, controlling the warm water mixing device to pump water from the hot water tank into the warm water tank according to the actual water intake parameters to replenish the warm water.

Wherein, if the processing terminal determines that the first remaining water temperature value is equal to the warm water temperature value, which indicates that the temperature of the warm water in the warm water tank will not affect the hot water pumped in. Therefore, the warm water mixing device is controlled to pump water from the hot water tank into the warm water tank at the flow rate corresponding to the actual water intake parameters to replenish the warm water.

Step S60112: when it is determined that the first remaining water temperature value fails to comply with the requirement of the preset warm water temperature value, controlling a drainage device to completely drain water from the warm water tank, and controlling the warm water mixing device to pump water from the hot water tank into the warm water tank according to the actual water intake parameters to replenish the warm water.

Wherein, if the processing terminal determines that the first remaining water temperature value is not equal to the warm water temperature value, this indicates that the temperature of the remaining warm water in the warm water tank is low, which may cause the temperature of the hot water pumped in to decrease and fail to comply with the temperature requirement for use. Therefore, the drainage device is controlled to drain all the water in the warm water tank to prevent the remaining warm water from affecting the temperature value of the hot water. The warm water mixing device is controlled to pump water from the hot water tank into the warm water tank at the flow rate corresponding to the actual water intake parameters to replenish the warm water.

The drainage device refers to a device used to drain remaining warm water in the warm water tank, including a water pump and a pipe, the water pump is configured to pump out and drain warm water in the warm water tank through the pipe.

Step S602: when it is determined that the actual water intake parameters include the mixed water intake parameter, controlling the warm water mixing device to pump water from the hot water tank and the cold water tank into the warm water tank for mixing to replenish the warm water through a preset agitation water intake method.

Figure 7:
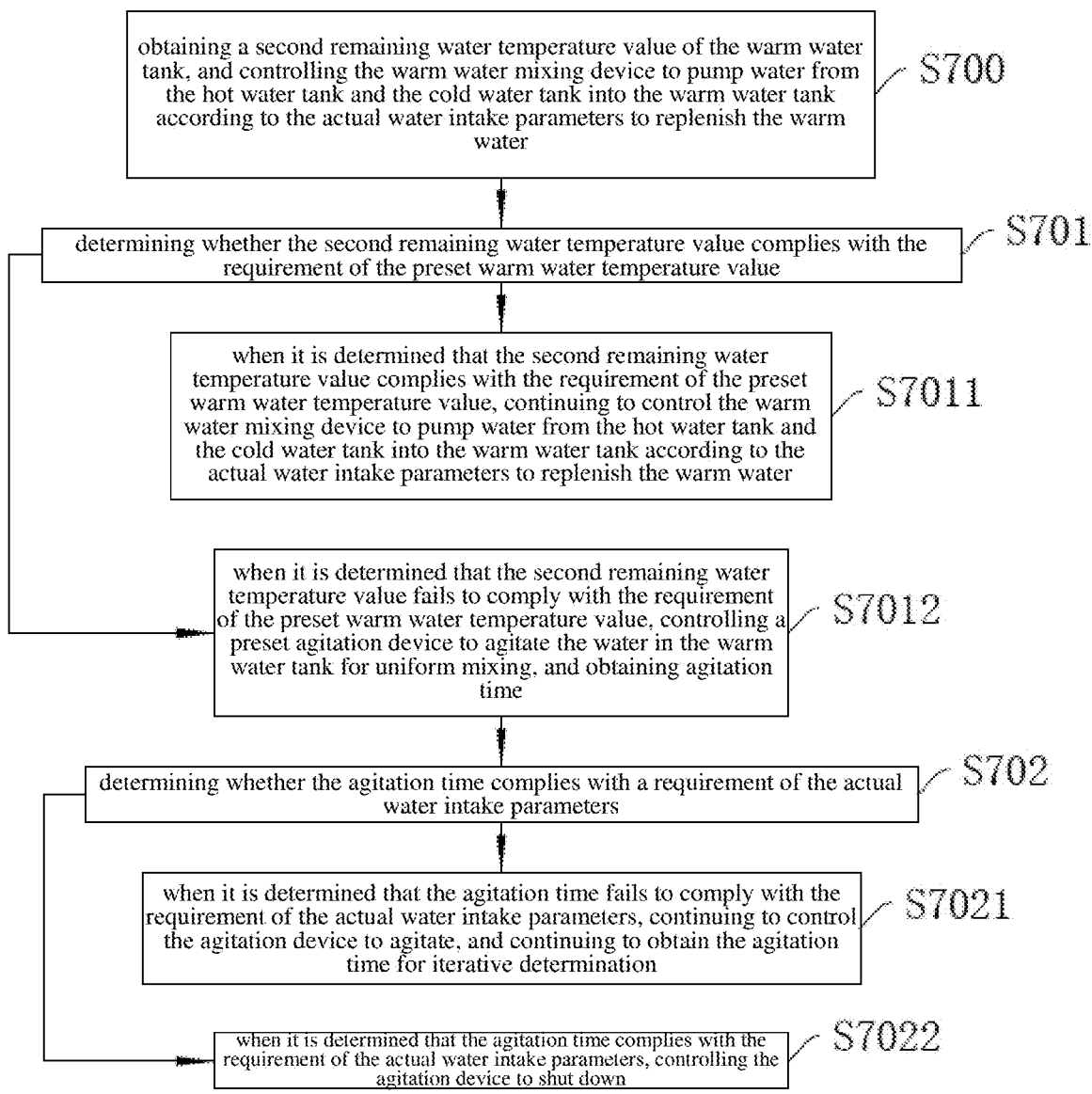
FIG. 7 is a flowchart of controlling the warm water mixing device to pump water from the hot water tank and the cold water tank into the warm water tank for mixing to replenish warm water through a preset agitation water intake method according to an embodiment of the present application.

Wherein, if the processing terminal determines that the actual water intake parameters include the mixed water intake parameter, this indicates that both hot and cold water may be pumped into the warm water tank Therefore, the warm water mixing device is controlled to pump water from the hot water tank and cold water tank into the warm water tank for mixing to replenish the warm water through the agitation water intake method, as detailed in steps of FIG. 7.

The agitation water intake method refers to a method for agitating hot water and remaining warm water to make the hot water and the warm water mix evenly upon hot water is pumped in by the warm water mixing device, which is stored by the operator in the processing terminal.

According to the above technical solution, when the actual water intake parameters include the separate water intake parameter and it is determined that the first remaining water temperature value fails to comply with the requirement of the preset warm water temperature value, this indicates that the temperature value of the hot water is just within a range of the warm water temperature value, but the temperature of the warm water is low. At this time, pumping in hot water cannot raise the temperature of the remaining water in a short time. Therefore, after the water is drained in the warm water tank, the warm water mixing device is controlled to pump water from the hot water tank into the warm water tank based on the actual water intake parameters to replenish the warm water. When the actual water intake parameters include the mixed water intake parameter, the warm water mixing device is controlled to pump water from the hot water tank and cold water tank into the warm water tank through the agitation water intake method, thereby improving the accuracy of warm water replenishment.

Referring to FIG. 7, controlling the warm water mixing device to pump water from the hot water tank and the cold water tank into the warm water tank for mixing to replenish the warm water through the preset agitation water intake method includes:

Step S700: obtaining a second remaining water temperature value of the warm water tank, and controlling the warm water mixing device to pump water from the hot water tank and the cold water tank into the warm water tank according to the actual water intake parameters to replenish the warm water.

Wherein, before pumping water, the second remaining water temperature value of the warm water tank is first detected. The warm water mixing device is then controlled to pump water from the hot water tank and the cold water tank into the warm water tank at a hot water flow rate and a cold water flow rate corresponding to the actual water intake parameters to replenish the warm water.

The second remaining water temperature value is consistent with the first remaining water temperature value in step S601, and will not be repeated here.

Step S701: determining whether the second remaining water temperature value complies with the requirement of the preset warm water temperature value.

Wherein, the requirement of the preset warm water temperature value in this step is consistent with that in Step S201, and will not be repeated here.

The processing terminal determines whether the second remaining water temperature value is equal to the warm water temperature value, thereby determining whether the warm water mixing device will pump in hot water and cold water simultaneously or first pump in hot water to raise the temperature of the remaining warm water.

Step S7011: when it is determined that the second remaining water temperature value complies with the requirement of the preset warm water temperature value, continuing to control the warm water mixing device to pump water from the hot water tank and the cold water tank into the warm water tank according to the actual water intake parameters to replenish the warm water.

Wherein, if the processing terminal determines that the second remaining water temperature value is equal to the warm water temperature value, this indicates that the warm water mixing device will pump in hot water and cold water simultaneously. Therefore, the warm water mixing device continues to be controlled to pump water from the hot water tank and the cold water tank into the warm water tank at the hot water flow rate and the cold water flow rate corresponding to the actual water intake parameters to replenish the warm water.

Step S7012: when it is determined that the second remaining water temperature value fails to comply with the requirement of the preset warm water temperature value, controlling a preset agitation device to agitate the water in the warm water tank for uniform mixing, and obtaining agitation time.

Wherein, if the processing terminal determines that the second remaining water temperature value is not equal to the warm water temperature value, this indicates that the warm water mixing device will first pump in hot water to raise the temperature of the remaining warm water. At this time, the agitation device is controlled to agitate, so that the hot water entering the warm water tank is evenly mixed with the warm water, accelerating an efficiency of temperature increase. The agitation time is detected to provide data support for subsequent control to stop the agitation device.

The agitation device refers to a device installed in the warm water tank for evenly mixing hot water and warm water, which may be configured by driving an agitation paddle with a motor. The agitation time refers to the time during which the agitation device agitates, which is measured by a timer.

Step S702: determining whether the agitation time complies with a requirement of the actual water intake parameters.

Wherein, the requirements of the actual water intake parameters refer to the specified pre-mixed hot water intake time in the actual water intake parameters. The processing terminal determines whether the agitation time is equal to the pre-mixed hot water intake time in the actual water intake parameters, thereby determining whether the time for pumping in the hot water exclusively has been completed.

Step S7021: when it is determined that the agitation time fails to comply with the requirement of the actual water intake parameters, continuing to control the agitation device to agitate, and continuing to obtain the agitation time for iterative determination.

Wherein, if the processing terminal determines that the agitation time is not equal to the pre-mixed hot water intake time in the actual water intake parameters, this indicates that the time for pumping in the hot water exclusively has not been completed. Therefore, the agitation device continues to be controlled to agitate, and the agitation time continues to be detected to continuously monitor time changes of the hot water being entered exclusively.

Step S7022: when it is determined that the agitation time complies with the requirement of the actual water intake parameters, controlling the agitation device to shut down.

Wherein, if the processing terminal determines that the agitation time is equal to the pre-mixed hot water intake time in the actual water intake parameters, this indicates that the time for pumping in the hot water exclusively has been completed. Subsequently, hot and cold water are pumped in simultaneously, and agitation is no longer required. Therefore, the agitation device is controlled to shut down.

According to the above technical solution, when the second remaining water temperature value fails to comply with the requirement of the preset warm water temperature value, this indicates that hot water needs to be pumped in first to be mixed with the remaining warm water to raise the warm water temperature. At this time, the agitation device is controlled to agitate to evenly mix the hot water and the warm water, and then the agitation device is controlled to shut down when the agitation time complies with the requirements of the actual water intake parameters, thereby improving the accuracy of warm water replenishment.

Referring to FIG. 8, obtaining the warm water usage trigger signal of the water-dispensing and ice-making machine includes:

Step S800: obtaining a start trigger signal of the water-dispensing and ice-making machine.

Wherein, the start trigger signal refers to a signal for powering on and starting the water-dispensing and ice-making machine. After the water-dispensing and ice-making machine is powered on, a buzzer sounds once, all indicator lights are turned on for 1 second and then turned off, entering a standby state. When the operator presses a power button, the buzzer sounds once, and a power light remains on. At this time, the water-dispensing and ice-making machine starts up, and the start trigger signal is activated.

Step S801: obtaining a button trigger signal of the water-dispensing and ice-making machine based on the start trigger signal.

Wherein, the button trigger signal refers to a signal received by the processing terminal of the water-dispensing and ice-making machine when a user press the button. This button trigger signal is obtained by the processing terminal continuously monitoring for button press activity in real time after receiving the start trigger signal.

Step S802: analyzing the button trigger signal to determine whether the button trigger signal is a preset hot water button signal, a preset cold water button signal, a preset warm water button signal, or a preset ice-making button signal.

Wherein, the hot water button signal refers to a signal triggered when the hot water button is pressed, the cold water button signal refers to a signal triggered when the cold water button is pressed, the warm water button signal refers to a signal triggered when the warm water button is pressed, and the ice-making button signal refers to a signal triggered when the ice-making button is pressed. All of the above signals are stored in the processing terminal by the operator.

The button trigger signal is received and compared with the hot water button signal, the cold water button signal, the warm water button signal, and the ice-making button signal respectively by the processing terminal, so as to provide data support for subsequent determination of how the water-dispensing and ice-making machine operates.

Step S8021: when it is determined that the button trigger signal is the hot water button signal, controlling the water-dispensing and ice-making machine to produce hot water based on the button trigger signal.

Wherein, if the processing terminal determines that the button trigger signal is the hot water button signal, this indicates that the hot water button is pressed by the operator. Therefore, the water-dispensing and ice-making machine is controlled to produce the hot water based on the button trigger signal with a specific method as follows: upon the hot water button is pressed once, the water-dispensing and ice-making machine starts to produce hot water; upon the hot water button is pressed again, the water-dispensing and ice-making machine starts to dispense the hot water. The hot water outflow stops after 60 seconds or upon another press of the hot water button is detected.

Step S8022: when it is determined that the button trigger signal is the cold water button signal, controlling the water-dispensing and ice-making machine to produce cold water based on the button trigger signal.

Wherein, if the processing terminal determines that the button trigger signal is the cold water button signal, this indicates that the cold water button is pressed by the operator. Therefore, the water-dispensing and ice-making machine is controlled to produce the cold water based on the button trigger signal with a specific method as follows: upon the cold water button is pressed once, the water-dispensing and ice-making machine starts to produce the cold water; upon the cold water button is pressed again, the water-dispensing and ice-making machine starts to dispense the cold water. The cold water outflow stops after 60 seconds or upon another press of the cold water button is detected.

Step S8023: when it is determined that the button trigger signal is the warm water button signal, outputting the warm water usage trigger signal.

Wherein, if the processing terminal determines that the button trigger signal is the warm water button signal, this indicates that the warm water button is pressed by the operator. Therefore, the warm water usage trigger signal is output.

Step S8024: when it is determined that the button trigger signal is the ice-making button signal, controlling the water-dispensing and ice-making machine to make ice based on the button trigger signal.

Wherein, if the processing terminal determines that the button trigger signal is the ice-making button signal, this indicates that the ice-making button is pressed by the operator. Therefore, the water-dispensing and ice-making machine is controlled to make ice based on the button trigger signal with a specific method as follows: upon the ice-making button is pressed once, the water-dispensing and ice-making machine starts to make ice; upon the ice-making button is long-pressed again, the water-dispensing and ice-making machine starts to dispense ice, and when the ice-making button is released, the water-dispensing and ice-making machine stops to dispense ice.

According to the above technical solution, after the start trigger signal of the water-dispensing and ice-making machine is detected, the button trigger signal is detected and analyzed to determine whether the button trigger is the hot water button signal, the cold water button signal, the warm water button signal, or the ice-making button signal, so as to control the water-dispensing and ice-making machine according to specific buttons, thereby improving the convenience of using the water-dispensing and ice-making machine.

Figure 9:
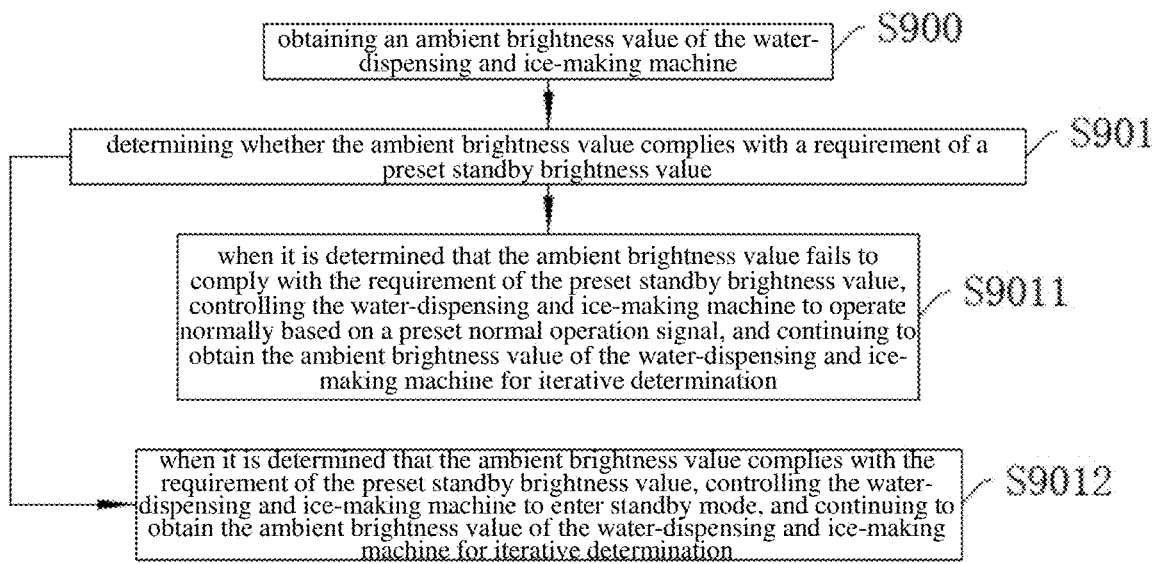
FIG. 9 is a flowchart of energy-saving steps according to an embodiment of the present application.

Referring to FIG. 9, the control method for the water-dispensing and ice-making machine further includes energy-saving steps, with specific steps including:

Step S900: obtaining an ambient brightness value of the water-dispensing and ice-making machine.

Wherein, the ambient brightness value refers to brightness of an environment where the water-dispensing and ice-making machine is located, which is detected by a photosensitive sensor and sent to the processing terminal.

Step S901: determining whether the ambient brightness value complies with a requirement of a preset standby brightness value.

Wherein, the standby brightness value refers to a illumination level of the water-dispensing and ice-making machine in a standby state. The specific value is determined by the operator according to actual conditions. The requirement of the standby brightness value refers to that the illumination should not greater than the standby brightness value.

The processing terminal determines whether the ambient brightness value is not greater than the standby brightness value, thereby determining whether there are still personnel active in the environment where the water-dispensing and ice-making machine is located.

Step S9011: when it is determined that the ambient brightness value fails to comply with the requirement of the preset standby brightness value, controlling the water-dispensing and ice-making machine to operate normally based on a preset normal operation signal, and continuing to obtain the ambient brightness value of the water-dispensing and ice-making machine for iterative determination.

Wherein, if the processing terminal determines that the ambient brightness value is greater than the standby brightness value, this indicates that there are still personnel active in the environment where the water-dispensing and ice-making machine is located. Therefore, the water-dispensing and ice-making machine is controlled to operate normally based on the normal operation signal, which includes: detecting the button signals, and continuing detect the ambient brightness value of the water-dispensing and ice-making machine, so as to continuously monitor changes in personnel activity in the environment where the water-dispensing and ice-making machine is located.

Step S9012: when it is determined that the ambient brightness value complies with the requirement of the preset standby brightness value, controlling the water-dispensing and ice-making machine to enter standby mode, and continuing to obtain the ambient brightness value of the water-dispensing and ice-making machine for iterative determination.

Wherein, if the processing terminal determines that the ambient brightness value is not greater than the standby brightness value, this indicates that there are no personnel active in the environment where the water-dispensing and ice-making machine is located. Therefore, the water-dispensing and ice-making machine is controlled to enter standby mode to save energy, and the ambient brightness value of the water-dispensing and ice-making machine continues to be detected, thereby continuously monitoring changes in personnel activity in the environment where the water-dispensing and ice-making machine is located.

According to the above technical solution, when it is determined that the ambient brightness value complies with the requirement of the standby brightness value, this indicates that the environment where the water-dispensing and ice-making machine is located is dark, and thus the water-dispensing and ice-making machine is controlled to enter standby mode to save energy.

Based on the same inventive concept, the present embodiment provides a control system for a water-dispensing and ice-making machine, including:

- an acquisition module, configured to obtain the warm water usage trigger signal, the warm water parameters, the warm water shutdown trigger signal, the hot water temperature value, the cold water temperature value, the existing warm water temperature value, the existing warm water weight value, the stable water proportion value, the first remaining water temperature value, the second remaining water temperature value, the agitation time, the start trigger signal, the button trigger signal, and the ambient brightness value;
- a memory, configured to store a program for executing the control method for the water-dispensing and ice-making machine;
- a processor, configured to load and execute the program in the memory to implement the control method for the water-dispensing and ice-making machine.

In the present application, when the warm water usage trigger signal is detected and it is determined that the warm water parameter complies with the requirements of the warm water usage parameter, the warm water dispensing device is controlled to dispense the warm water for use. When the warm water parameter fails to comply with the requirements of the warm water usage parameter, the warm water mixing device is controlled to pump water from the hot water tank and the cold water tank into the warm water tank for mixing to replenish the warm water, without a need for users to repeatedly receive and mix water to obtain the warm water, thereby improving the convenience of using the water-dispensing and ice-making machine.

Those skilled in the art can clearly understand that, for a convenience and brevity of description, a division of the above functional modules is only used as an example. In practical applications, the above functions can be allocated to be completed by different functional modules as needed. That is, an internal structure of the device is divided into different functional modules to complete all or part of the functions described above. The specific working processes of the system, device, and units described above may refer to corresponding processes in the method embodiment mentioned above, which will not be repeated here.

The embodiment of the present application provides a computer-readable storage medium storing a computer program that may be loaded and executed by the processor to implement the method for the water-dispensing and ice-making machine.

A computer-readable storage medium includes various medium that may store program codes, such as a USB flash drive, a mobile hard disk, a read-only memory (ROM), a random access memory (RAM), a magnetic disk, or an optical disc.

Based on the same inventive concept, the embodiment of the present application provides an intelligent terminal including a memory and a processor, wherein the memory stores the computer program capable of being loaded and executed by the processor to perform the control method for the water-dispensing and ice-making machine.

Those skilled in the art can clearly understand that, for the convenience and simplicity of description, the division of the above functional modules is only used as the example. In practical applications, the above functions can be allocated to be completed by different functional modules as needed. That is, the internal structure of the device may be divided into different functional modules to complete all or part of the functions described above. The specific working processes of the system, device, and units described above can refer to corresponding processes in the method embodiment mentioned above, which will not be repeated here.

The above are the preferred embodiments of the present application, which are not intended to limit the protection scope of the present application, any feature provided in this description (including the abstract and drawings), unless otherwise specified, may be replaced by other equivalent or similar-purpose alternative features. That is, unless otherwise specified, each feature is merely an example of a series of equivalent or similar features.

What is claimed is:

1. A control method for a water-dispensing and ice-making machine, comprising:
    obtaining a warm water usage trigger signal of the water-dispensing and ice-making machine;
    obtaining warm water parameters of a warm water tank based on the warm water usage trigger signal;
    determining whether the warm water parameters comply with requirements of preset warm water usage parameters;
    when it is determined that the warm water parameters comply with the requirements of the preset warm water usage parameters, controlling a warm water dispensing device to dispense warm water in the warm water tank for use, and continuing to obtain the warm water parameters for iterative determination;
    when it is determined that the warm water parameters fail to comply with the requirements of the preset warm water usage parameters, controlling a warm water mixing device to pump water from a hot water tank and a cold water tank into the warm water tank for mixing to replenish the warm water, and continuing to obtain the warm water parameters for iterative determination;
    receiving a warm water shutdown trigger signal; and
    controlling the warm water dispensing device and the warm water mixing device to shut down based on the warm water shutdown trigger signal,
    wherein controlling the warm water mixing device to pump water from the hot water tank and the cold water tank into the warm water tank for mixing to replenish the warm water comprises:
        obtaining a hot water temperature value of the hot water tank and a cold water temperature value of the cold water tank in real time;
        determining whether the hot water temperature value complies with a requirement of a preset warm water temperature value;
        when it is determined that the hot water temperature value complies with the requirement of the preset warm water temperature value, determining a water proportion value based on a preset full-hot-water proportion value;
        when it is determined that the hot water temperature value fails to comply with the requirement of the preset warm water temperature value, analyzing the hot water temperature value and the cold water temperature value to determine the water proportion value;
        analyzing the water proportion value and a preset water intake parameter value to determine actual water intake parameters; and
        controlling the warm water mixing device to pump water from the hot water tank and the cold water tank into the warm water tank for mixing to replenish the warm water according to the actual water intake parameters.

2. The control method for the water-dispensing and ice-making machine according to claim 1, wherein analyzing the hot water temperature value and the cold water temperature value to determine the water proportion value, comprises:
    analyzing the hot water temperature value and the preset warm water temperature value to determine a hot water temperature change value;
    analyzing the cold water temperature value and the preset warm water temperature value to determine a cold water temperature change value; and
    analyzing the hot water temperature change value and the cold water temperature change value to determine the water proportion value of hot water and cold water.

3. The control method for the water-dispensing and ice-making machine according to claim 1, after the water proportion value is determined, further comprises:
    obtaining an existing warm water temperature value of the warm water tank;
    determining whether the existing warm water temperature value complies with the requirement of the preset warm water temperature value;
    when it is determined that the existing warm water temperature value complies with the requirement of the preset warm water temperature value, not correcting the water proportion value;
    when it is determined that the existing warm water temperature value fails to comply with the requirement of the preset warm water temperature value, determining whether the water proportion value complies with a requirement of the preset full-hot-water proportion value;

when it is determined that the water proportion value complies with the requirement of the preset full-hot-water proportion value, not correcting the water proportion value; and when it is determined that the water proportion value fails to comply with the requirement of the preset full-hot-water proportion value, correcting the water proportion value through a preset remaining warm water correction method.

4. The control method for the water-dispensing and ice-making machine according to claim 3, wherein correcting the water proportion value through the preset remaining warm water correction method comprises:

obtaining an existing warm water weight value of the warm water tank;

analyzing the existing warm water weight value, the existing warm water temperature value, the hot water temperature value and the preset warm water temperature value to determine a pre-mixed hot water volume value;

analyzing the pre-mixed hot water volume value and the preset water intake parameter value to determine pre-mixed hot water intake time;

associating the preset full-hot-water proportion value with the pre-mixed hot water intake time to generate a pre-mixed water proportion value;

obtaining a stable water proportion value; and associating the pre-mixed water proportion value with the stable water proportion value to generate the water proportion value.

5. The control method for the water-dispensing and ice-making machine according to claim 1, wherein controlling the warm water mixing device to pump water from the hot water tank and the cold water tank into the warm water tank for mixing to replenish the warm water according to the actual water intake parameters, comprises:

determining whether the actual water intake parameters comprise a preset separate water intake parameter or a preset mixed water intake parameter;

when it is determined that the actual water intake parameters comprise the preset separate water intake parameter, obtaining a first remaining water temperature value of the warm water tank;

determining whether the first remaining water temperature value complies with the requirement of the preset warm water temperature value;

when it is determined that the first remaining water temperature value complies with the requirement of the preset warm water temperature value, controlling the warm water mixing device to pump water from the hot water tank into the warm water tank according to the actual water intake parameters to replenish the warm water;

when it is determined that the first remaining water temperature value fails to comply with the requirement of the preset warm water temperature value, controlling a drainage device to completely drain water from the warm water tank, and controlling the warm water mixing device to pump water from the hot water tank into the warm water tank according to the actual water intake parameters to replenish the warm water; and when it is determined that the actual water intake parameters comprise the preset mixed water intake parameter, controlling the warm water mixing device to pump water from the hot water tank and the cold water tank into the warm water tank for mixing to replenish the warm water through a preset agitation water intake method.

6. The control method for the water-dispensing and ice-making machine according to claim 5, wherein controlling the warm water mixing device to pump water from the hot water tank and the cold water tank into the warm water tank for mixing to replenish the warm water through the preset agitation water intake method, comprising:

obtaining a second remaining water temperature value of the warm water tank, and controlling the warm water mixing device to pump water from the hot water tank and the cold water tank into the warm water tank according to the actual water intake parameters to replenish the warm water;

determining whether the second remaining water temperature value complies with the requirement of the preset warm water temperature value;

when it is determined that the second remaining water temperature value complies with the requirement of the preset warm water temperature value, continuing to control the warm water mixing device to pump water from the hot water tank and the cold water tank into the warm water tank according to the actual water intake parameters to replenish the warm water;

when it is determined that the second remaining water temperature value fails to comply with the requirement of the preset warm water temperature value, controlling an agitation device to agitate water in the warm water tank for uniform mixing, and obtaining agitation time;

determining whether the agitation time complies with a requirement of the actual water intake parameters;

when it is determined that the agitation time fails to comply with the requirement of the actual water intake parameters, continuing to control the agitation device to agitate, and continuing to obtain the agitation time for iterative determination; and when it is determined that the agitation time complies with the requirement of the actual water intake parameters, controlling the agitation device to shut down.

7. The control method for the water-dispensing and ice-making machine according to claim 1, wherein obtaining the warm water usage trigger signal of the water-dispensing and ice-making machine, comprising:

obtaining a start trigger signal of the water-dispensing and ice-making machine;

obtaining a button trigger signal of the water-dispensing and ice-making machine based on the start trigger signal;

analyzing the button trigger signal to determine whether the button trigger signal is a preset hot water button signal, a preset cold water button signal, a preset warm water button signal, or a preset ice-making button signal;

when it is determined that the button trigger signal is the preset hot water button signal, controlling the water-dispensing and ice-making machine to produce hot water based on the button trigger signal;

when it is determined that the button trigger signal is the preset cold water button signal, controlling the water-dispensing and ice-making machine to produce cold water based on the button trigger signal;

when it is determined that the button trigger signal is the preset warm water button signal, outputting the warm water usage trigger signal; and when it is determined that the button trigger signal is the preset ice-making button signal, controlling the water-dispensing and ice-making machine to make ice based on the button trigger signal.

8. The control method for the water-dispensing and ice-making machine according to claim 7, further comprising:
obtaining an ambient brightness value of the water-dispensing and ice-making machine;
determining whether the ambient brightness value complies with a requirement of a preset standby brightness value;
when it is determined that the ambient brightness value fails to comply with the requirement of the preset standby brightness value, controlling the water-dispensing and ice-making machine to operate normally based on a preset normal operation signal, and continuing to obtain the ambient brightness value of the water-dispensing and ice-making machine for iterative determination; and
when it is determined that the ambient brightness value complies with the requirement of the preset standby brightness value, controlling the water-dispensing and ice-making machine to enter a standby mode, and continuing to obtain the ambient brightness value of the water-dispensing and ice-making machine for iterative determination.

9. A control system for the water-dispensing and ice-making machine, comprising:
an acquisition module, configured to obtain the warm water usage trigger signal, the warm water parameters, and the warm water shutdown trigger signal;
a memory, storing a program for executing the control method for the water-dispensing and ice-making machine according to claim 1; and
a processor, configured to perform the control method for the water-dispensing and ice-making machine when loading and executing the program in the memory.

10. A computer-readable storage medium, storing a computer program, that when loaded and executed by a processor, implements the control method for the water-dispensing and ice-making machine according to claim 1.

* * * * *